(12) United States Patent
Yasuda et al.

(10) Patent No.: US 7,903,524 B2
(45) Date of Patent: Mar. 8, 2011

(54) OPTICAL SIGNAL RECORDING MEDIUM AND INFORMATION RECORDING/REPRODUCING APPARATUS

(75) Inventors: Shin Yasuda, Kanagawa (JP); Kazuhiro Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 378 days.

(21) Appl. No.: 12/025,805

(22) Filed: Feb. 5, 2008

(65) Prior Publication Data
US 2008/0267041 A1    Oct. 30, 2008

(30) Foreign Application Priority Data
Apr. 26, 2007   (JP) .................................. 2007-117599

(51) Int. Cl.
*G11B 7/00*    (2006.01)

(52) U.S. Cl. ........................ 369/103; 369/44.37; 369/284
(58) Field of Classification Search ........................ None
See application file for complete search history.

(56) References Cited

U.S. PATENT DOCUMENTS

2004/0042375 A1*  3/2004  Edwards ...................... 369/103
2006/0171284 A1*  8/2006  Matsumoto et al. .......... 369/103

FOREIGN PATENT DOCUMENTS
JP          2002-63733 A     2/2002

* cited by examiner

*Primary Examiner* — Joseph Haley
(74) *Attorney, Agent, or Firm* — Sughrue Mion, PLLC

(57) ABSTRACT

An optical signal recording medium includes at least one signal recoding plane in which an optical signal is to be recorded, and a control information region which is a portion other than the signal recoding plane, and in which a diffraction grating is disposed.

18 Claims, 6 Drawing Sheets

OPTICAL SIGNAL RECORDING MEDIUM AND INFORMATION RECORDING/REPRODUCING APPARATUS

CROSS-REFERENCE TO RELATED APPLICATIONS

This application is based on and claims priority under 35 USC 119 from Japanese Patent Application No. 2007-117599 filed on Apr. 26, 2007.

BACKGROUND

1. Technical Field

The present invention relates to an optical signal recording medium and an information recording/reproducing apparatus.

2. Related Art

A recording medium in which an optical signal is recorded as a hologram is known. In order to improve the S/N ratio (signal/noise ratio) of a reproduced image of a hologram recorded in such a recording medium, relative positions in the optical axis direction and an translational direction of the recording medium and a light beam irradiating the recording medium to obtain the reproduced image, the intersection angle between the recording medium and the light beam, and the like are made coincident with predetermined conditions.

SUMMARY

According to an aspect of the invention, there is provided an optical signal recording medium has: at least one signal recoding plane in which an optical signal is to be recorded; and a control information region which is a portion other than the signal recoding plane, and in which a diffraction grating is disposed.

BRIEF DESCRIPTION OF THE DRAWINGS

Exemplary embodiment(s) of the present invention will be described in detail based on the following figures, wherein.

Figure 1:
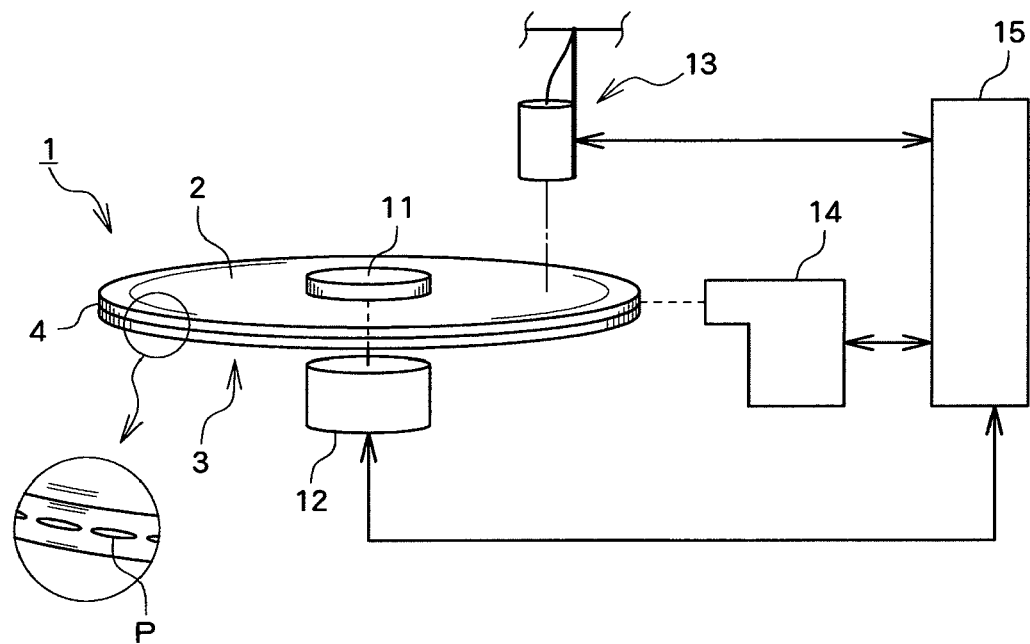
FIG. 1 is a diagram showing a configuration example of an optical signal recording medium and information recording/reproducing apparatus of an embodiment of the invention.

DESCRIPTION OF REFERENCE NUMERALS AND SIGNS 1 optical signal recording medium, 2, 3 signal recording plane, 4 control information region, 11 supporting portion, 12 driving portion, 13 information recording/reproducing portion, 14 medium posture detecting portion, 15 controlling portion, 21, 31 light source, 22, 32 beam splitter, 23 spatial light modulator, 24 first objective optical system, 25 second objective optical system, 26 light receiving portion, 27 stage, 33 optical system, 34 optical detecting portion.

DETAILED DESCRIPTION

An embodiment of the invention will be described with reference to the accompanying drawings. As exemplarily shown in FIG. 1, an information recording/reproducing apparatus using an optical signal recording medium of the embodiment includes the optical signal recording medium 1, a supporting portion 11, a driving portion 12, an information recording/reproducing portion 13, a medium posture detecting portion 14, and a controlling portion 15.

The optical signal recording medium 1 is a plate-like medium having a disk-like shape or the like, and includes a circular surface 2, a circular rear face 3, and a side face 4 which extends along the circumference. In the embodiment, at least the surface 2 is set as a plane on which an optical signal is incident, and information is recorded in the volume of the medium including the surface 2. Hereinafter, a plane in which information is recorded, such as the surface 2 is referred to as an information recording plane.

Figure 2:
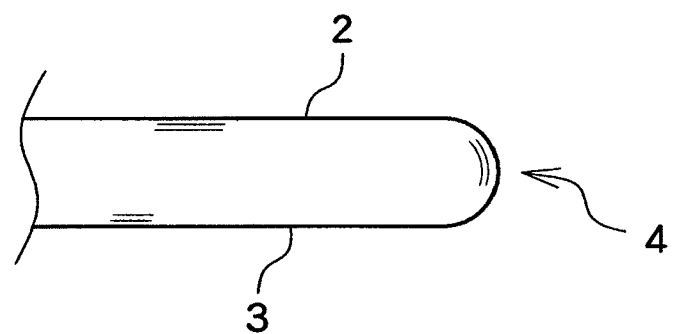
FIG. 2 is a diagram showing an example of the shape of the side face of the optical signal recording medium of the embodiment of the invention.

As shown in FIG. 2, the side face 4 may have a semicircular section shape, and configure a curved face which is outward convex. FIG. 2 is a section view of the optical signal recording medium 1 taken along a plane perpendicular to a signal recording plane. A diffraction grating P configured by pits is disposed in the side face 4. The diffraction grating is used as a so-called control signal. As described later, a result of reading of the diffraction grating is used in tracking and focusing controls. In the embodiment, namely, the side face of the optical signal recording medium 1 functions as a control information region.

The supporting portion 11 supports the optical signal recording medium 1. When the optical signal recording medium 1 has a disk-like shape, for example, the optical signal recording medium 1 is rotatably supported at a center portion of the medium. In the case where the optical signal recording medium 1 has a rectangular shape, the optical signal recording medium 1 is supported so as to be movable in a direction parallel to the information recording plane. In accordance with instructions supplied from the controlling portion 15, the supporting portion 11 inclines the rotation axis of the optical signal recording medium 1 by an instructed angle, to change the intersection angle between the optical axis of a light beam which is emitted for recording or reproducing a signal by the information recording/reproducing portion 13, and the information recording plane of the optical signal recording medium 1.

The driving portion 12 includes an actuator, and rotarily or translationally drives the optical signal recording medium 1 which is supported by the supporting portion 11. In accordance with instructions supplied from the controlling portion 15, the driving portion 12 controls the position of intersection of the optical signal recording medium 1 and the light beam which is emitted for recording or reproducing information by the information recording/reproducing portion 13.

The medium posture detecting portion 14 detects wobbling (translational wobbling) in a direction parallel to the signal recording plane of the optical signal recording medium 1, and wobbling (planar wobbling) in a direction perpendicular to the signal recording plane, with using information recorded on the side face of the optical signal recording medium 1. Information of results of the detections of the translational wobbling and the planar wobbling is supplied to the controlling portion 15, and used by the controlling portion 15 in controls (tracking and focusing controls) of relative positions of the information recording/reproducing portion 13 and the optical signal recording medium 1. An example of the configuration of the medium posture detecting portion 14 will be described later.

Figure 3:
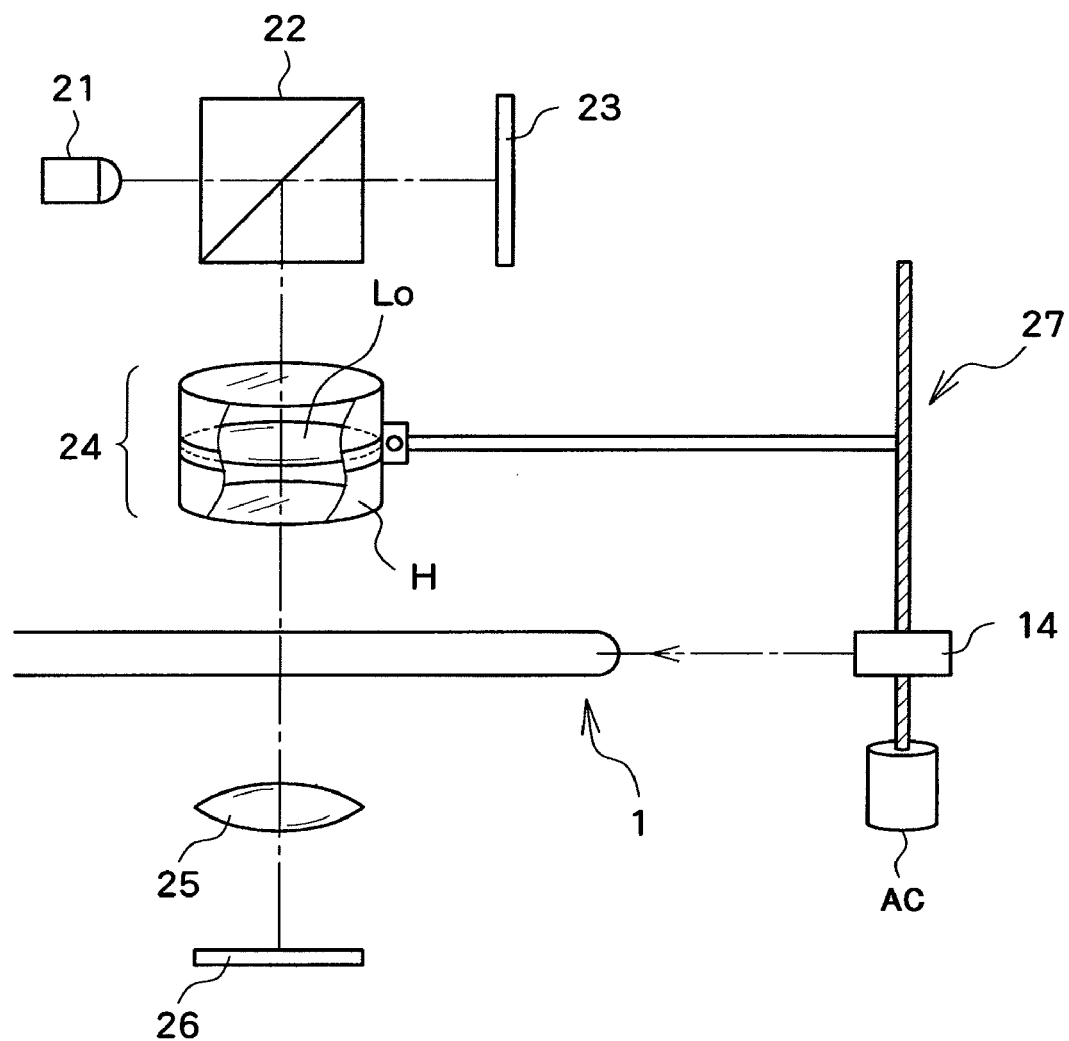
FIG. 3 is a diagram showing a configuration example of an information recording/reproducing portion in the information recording/reproducing apparatus of the embodiment of the invention.

As exemplarily shown in FIG. 3, the information recording/reproducing portion 13 includes a light source 21, a beam splitter 22, a spatial light modulator 23, a first objective optical system 24, a second objective optical system 25, a light receiving portion 26, and a stage 27.

In the information recording/reproducing portion 13, light emitted from the light source 21 which is configured by a laser diode or the like is introduced into the beam splitter 22. The beam splitter guides the light introduced from the light source 21, to the spatial light modulator 23. Also, the beam splitter 22 guides light reflected from the spatial light modulator 23, to the first objective optical system 24. The first objective optical system 24 includes an objective lens Lo, and a head case H which covers the lens. FIG. 3 shows a state where a part of the head case H is cut away and the objective lens Lo is exposed.

The second objective optical system 25 causes an optical signal which is transmitted through the optical signal recording medium 1 and arrives the system, to be imaged onto a light receiving surface of the light receiving portion 26. The light receiving portion 26 supplies image data indicative of the received optical signal, to the controlling portion 15.

In the information recording/reproducing portion 13, when information is to be recorded, an image indicative of the information to be recorded is displayed on the spatial light modulator 23. For example, the spatial light modulator 23 is a liquid crystal panel, and, in accordance with instructions supplied from the controlling portion 15, displays an instructed image. According to the configuration, the signal recording plane of the optical signal recording medium 1 is irradiated with the image indicative of the information to be recorded, and the information is fixed to the signal recording plane.

By contrast, when information is to be reproduced, the information recording/reproducing portion 13 irradiates the optical signal recording medium 1 with reference light (read light). When the light is transmitted through the optical signal recording medium 1, the light is modulated by an image recorded in the portion irradiated with the light on the signal recording plane of the optical signal recording medium 1. The modulated light is guided through the second objective optical system 25 to the light receiving portion 26, and the image indicative of information is formed on the light receiving surface of the light receiving portion 26. The image is optically read, and then supplied to the controlling portion 15. In the controlling portion 15, the information is decoded to be reproduced, and the information is reproduced.

The stage 27 supports the first objective optical system 24 of the information recording/reproducing portion 13, and the medium posture detecting portion 14. The stage 27 includes an actuator AC. In accordance with instructions supplied from the controlling portion 15, the stage 27 drives the actuator AC to integrally move the first objective optical system 24 and the medium posture detecting portion 14 in a direction perpendicular to the signal recording plane of the optical signal recording medium 1, thereby controlling the distance between the objective lens Lo of the first objective optical system 24 and the signal recording plane of the optical signal recording medium 1 (focusing). Furthermore, the position of intersection of the optical signal recording medium 1 and a light beam which is emitted toward the side face of the optical signal recording medium 1 by the medium posture detecting portion 14 is controlled.

Figure 4:
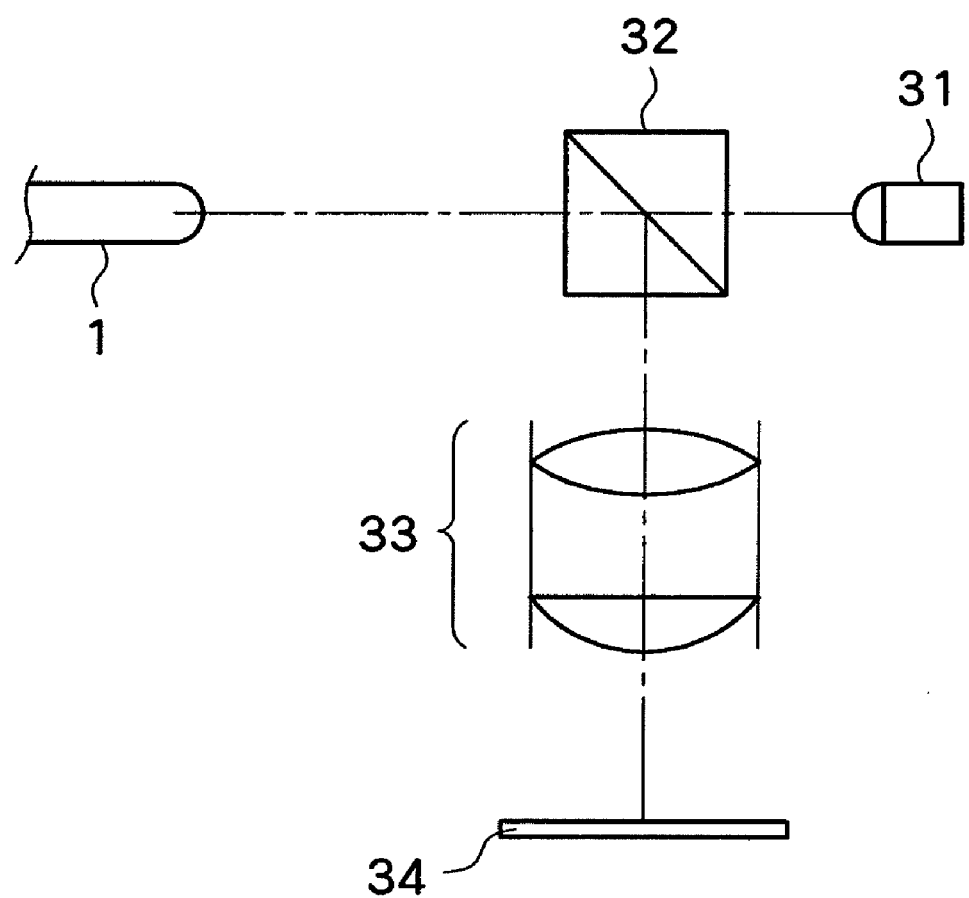
FIG. 4 is a diagram showing a configuration example of a medium posture detecting portion which reads control information recoded in the optical signal recording medium of the embodiment of the invention.

The example of the configuration of the medium posture detecting portion 14 will be described. As exemplarily shown in FIG. 4, the medium posture detecting portion 14 includes a light source 31, a beam splitter 32, an optical system 33, and an optical detecting portion 34.

For example, the light source 31 is a laser diode, and irradiates the beam splitter 32 with light. The beam splitter 32 guides the light emitted from the light source 31 to the side face of the optical signal recording medium 1, and guides light reflected from the side face of the optical signal recording medium 1 to the optical system 33.

For example, the optical system 33 is a cylindrical lens which causes astigmatism, or a an optical system (astigmatic optical system) configured by a prism, and makes the light which is received through the beam splitter 32, to be imaged onto optical detectors of the optical detecting portion 34.

For example, the optical detecting portion 34 is a so-called four-split optical detector including four optical detectors which are arranged in a 2×2 matrix. The optical detectors may be, for example, photodiodes. The optical detecting portion 34 detects a signal of light reflected from the side face of the optical signal recording medium 1, and supplies a result of the detection to the controlling portion 15.

In the embodiment, on the basis of an image formed on the four-split optical detector, the controlling portion 15 detects the distance between the optical signal recording medium 1 and the first objective optical system 24. In this detection, a well known method such as the push-pull method or the three-beam method can be employed. On the basis of the image formed on the four-split optical detector, furthermore, the controlling portion 15 detects translational wobbling of the optical signal recording medium 1. In this detection, a well known method such as the astigmatism method, the Foucault method, or the knife-edge method can be used.

For example, the controlling portion 15 includes a microcomputer, and the like. The controlling portion 15 receives information of the reflected light pattern which is produced by the diffraction grating disposed on the side face of the optical signal recording medium 1, and which is then detected by the medium posture detecting portion 14. Then, the controlling portion 15 receives a result of imaging on the optical detecting portion 34 from the medium posture detecting portion 14, and detects the distance (planar wobbling) between the optical signal recording medium 1 and the first objective optical system 24, and translational wobbling of the optical signal recording medium 1. On the basis of the amount of the detected planar wobbling, the controlling portion 15 controls the supporting portion 11 to adjust the inclination angle of the optical signal recording medium 1. Namely, the controlling portion 15 operates as an optical information processing portion and a positioning controlling portion.

Figure 5A:
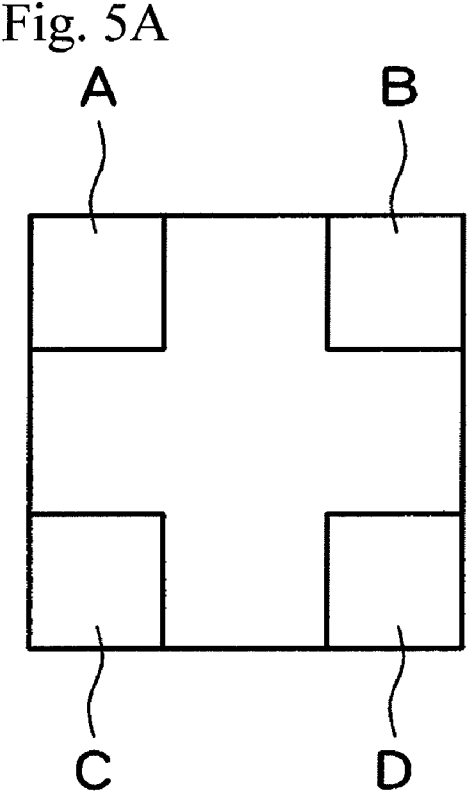
FIGS. 5A and 5B are diagrams showing a configuration example of an optical detector of the medium posture detecting portion in the information recording/reproducing apparatus of the embodiment of the invention.

In the case where the optical detecting portion 34 of the medium posture detecting portion 14 is a four-split photodiode (photodiodes are indicated by A, B, C, and D, respectively) shown in FIG. 5A, for example, the controlling portion 15 controls the inclination angle of the supporting portion 11 so as to attain $$IA+ID=IB+IC$$

where IX is the intensity of light incident on a photodiode X.

Moreover, the controlling portion 15 controls the actuator AC of the stage 27 so as to attain IA+IB=IC+ID, whereby performing the focusing controls.

On the basis of the amount of the detected translational wobbling of the optical signal recording medium 1, furthermore, the controlling portion 15 controls the driving portion 12. Following the amount of the translational wobbling of the optical signal recording medium 1, the controlling portion controls relative positions of the first objective optical system 24 and the optical signal recording medium 1.

In the embodiment, the side face of the optical signal recording medium 1 which is the control information region may include a portion which is parallel to the optical axis of the light beam for recording a signal into the signal recoding plane, or reproducing a signal from the signal recoding plane, and the diffraction grating may be formed in the parallel portion. According to the configuration, light for recording or reproducing information is less affected by scattered light due to the light beam emitted by the medium posture detecting portion 14.

Alternatively, the side face of the optical signal recording medium 1 which is the control information region may be configured by a curved surface. For example, the curved surface may be outward convex. As one example, the curved surface may be a curved face having a section shape which is substantially semicircular.

In the case where the control information region is configured by a curved surface, when the side face of the optical signal recording medium 1 which is the control information region is not a curved surface, the reflection directions from the pits are differentiated by the angle of the planar wobbling. By contrast, when the side face of the optical signal recording medium is a curved surface, planar wobbling of the optical signal recording medium 1 causes the reflection directions from the pits to be possibly larger than the angle of the planar wobbling. Therefore, the accuracy of detecting planar wobbling is enhanced.

Figure 5B:
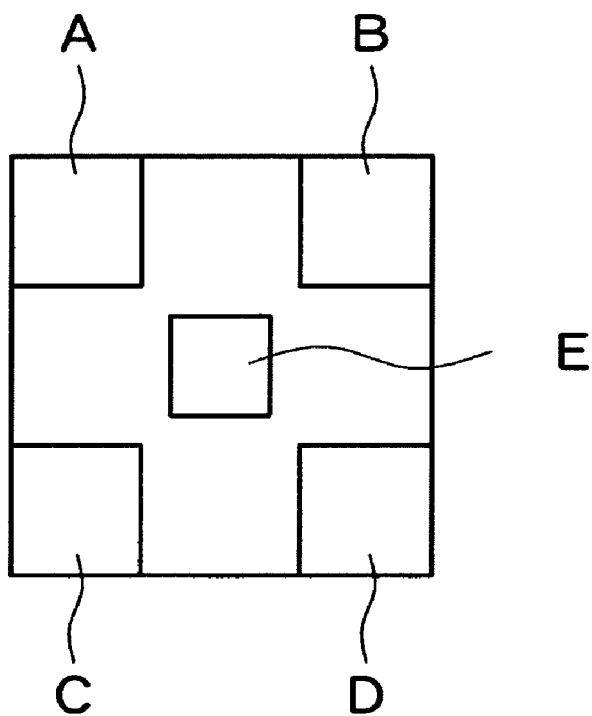

Alternatively, the diffraction grating which is formed in the control information region of the optical signal recording medium 1 may be a computer generated hologram (CGH) indicating a Fourier pattern, in place of the pits. In the alternative, as exemplarily shown in FIG. 5B, the optical detecting portion 34 of the medium posture detecting portion 14 may be configured so that CMOS (Complementary Metal Oxide Semiconductor) cameras are placed in the four corners of a rectangle and a central portion, respectively. The controlling portion 15 controls the inclination angle of the supporting portion 11 so as to attain $$IA+ID=IB+IC$$

where IX is the intensity of light incident on the five CMOS cameras (A to D in the four corners and E in the central portion).

Moreover, the controlling portion 15 controls the actuator AC of the stage 27 so as to attain IA+IB=IC+ID, whereby performing the focusing controls.

The controlling portion 15 controls the driving portion 12 so that the diameter RE of the light beam which is incident on the CMOS camera E placed in the central portion is minimum (or has a specified size), thereby adjusting the position of the optical signal recording medium 1. Namely, direct light (zero-order light) which is not diffracted by the diffraction grating is incident on the CMOS camera E placed in the central portion, and the distance between the optical signal recording medium 1 and the medium posture detecting portion 14 can be detected based on the size of the light beam. In the embodiment, therefore, the position of the optical signal recording medium 1 is adjusted on the basis of the detected distance.

Figure 6:
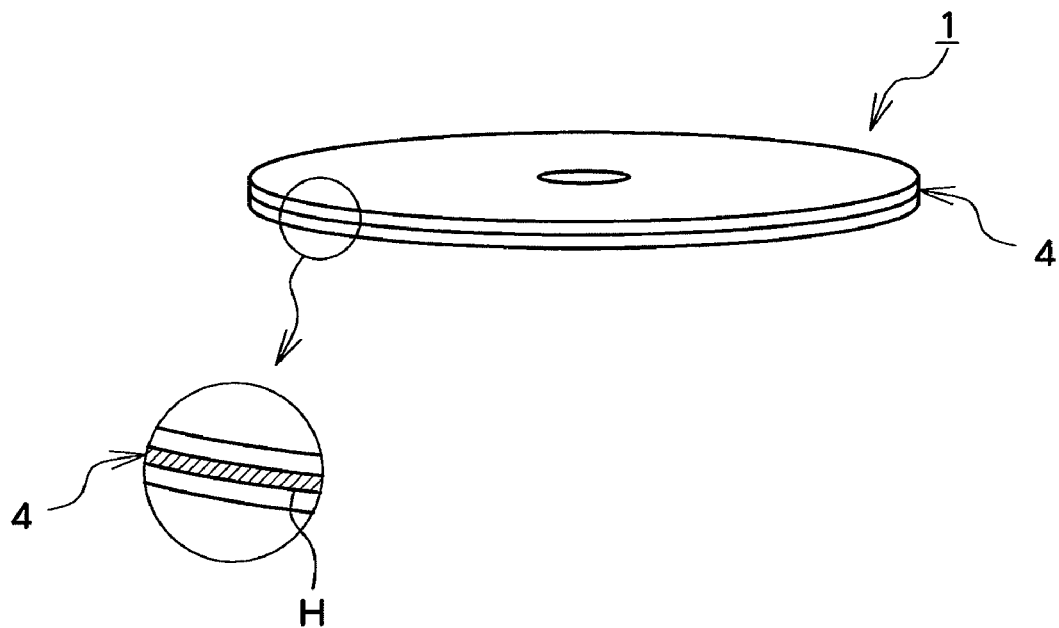
FIG. 6 is a diagram showing another example of the shape of the side face of the optical signal recording medium of the embodiment of the invention.

Alternatively, the diffraction grating may be a hologram indicating different information depending on a location (FIG. 6). In this case, for example, a hologram in which different information is recorded at each rotation angle H may be formed on the side face of the disk-like optical signal recording medium 1. In this case, the controlling portion 15 observes diffracted light from the hologram to detect the rotation position of the optical signal recording medium 1, and, on the basis of a result of the detection, controls the relative positions of the optical signal recording medium 1 and the information recording/reproducing portion 13.

Figure 7:
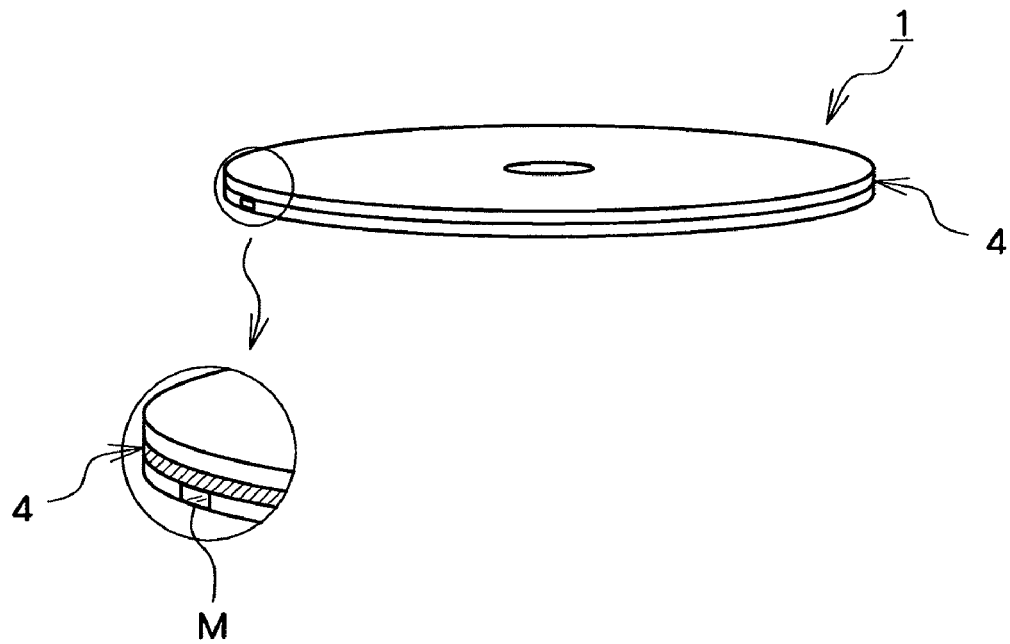
FIG. 7 is a diagram showing a further example of the shape of the side face of the optical signal recording medium of the embodiment of the invention.

In addition to or in place of the above-mentioned diffraction grating, a light reflecting member (mirror) M which is an identification information recording portion indicating a predetermined position may be disposed on the side face of the optical signal recording medium 1 (FIG. 7). In this case, the medium posture detecting portion 14 may detect reflected light from the mirror. At the timing when the reflected light is detected, the controlling portion 15 determines that the optical signal recording medium 1 is in the predetermined position. In the case where the optical signal recording medium 1 has a disk-like shape, for example, a light reflecting member may be adhered at each predetermined rotation angle, and, while setting the rotation angle as a reference position, a process of detecting the rotation angle of the optical signal recording medium 1 may be performed. When the optical signal recording medium 1 is rotated at a constant angular velocity a, for example, the elapsed time t after the reference position is detected is measured by a timer which is not shown. The rotation angle θ is calculated as θ=ωt. The reflected light from the light reflecting member may be disposed aside from the optical system for detecting the diffraction grating.

The embodiment may be configured so that a light reflecting member is formed on the outer periphery of the head case H of the information recording/reproducing portion 13, the member is irradiated with convergent or divergent light, and the optical detector D fixed to the stage 27 detects the shape of the reflected light of the diameter of the light beam. Using a result of the detection, the controlling portion 15 detects the distance from the optical detector D fixed to the stage 27, to the head case H. Using the distance (which may be predetermined, or which may be detected with using the medium posture detecting portion 14) from the outer circumference of the optical signal recording medium 1 to the optical detector D, and that from the optical detector D to the head case H, the controlling portion 15 detects the distance from the rotation axis (center) of the optical signal recording medium 1 to the position where the light beam emitted from the first objective optical system 24 incorporated in the head case H intersects with the optical signal recording medium 1. Alternatively, the controlling portion may detect the distance from the outer circumference of the optical signal recording medium 1 to the position where the light beam emitted from the first objective optical system 24 incorporated in the head case H intersects with the optical signal recording medium 1.

According to the configuration, the controlling portion 15 can detect which position of the signal recording plane is irradiated by the information recording/reproducing portion 13.

Figure 8:
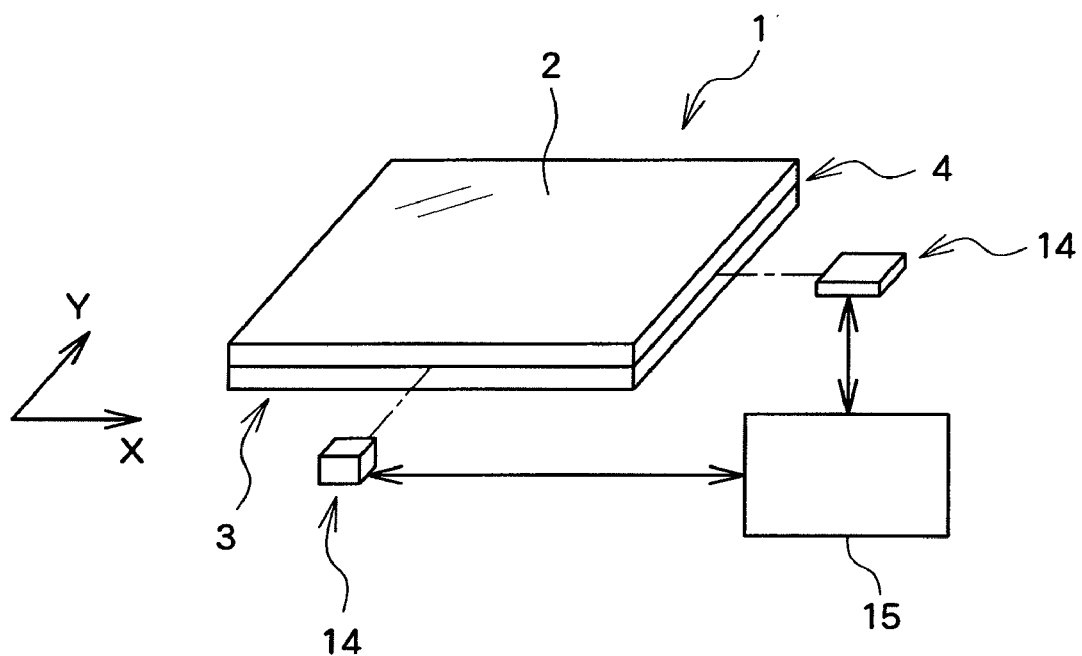
FIG. 8 is a diagram showing another configuration example of the optical signal recording medium and information recording/reproducing apparatus of the embodiment of the invention.

In the case where the optical signal recording medium 1 has a rectangular shape, as exemplarily shown in FIG. 8, plural medium posture detecting portions 14 may be placed so as to be opposed to the side faces of the edges of the rectangle (it is assumed that the edges extend the X and Y axes, respectively). Using signals detected by the medium posture detecting portions 14, the controlling portion 15 detects the X- and Y-axis direction positions of the optical signal recording medium 1. Using a result of the detection, the controlling portion controls the driving portion 12 to control the position of the optical signal recording medium 1.

In the embodiment, the example in which a transmissive hologram is coaxially recorded has been described. The invention is not restricted to this. A reflective hologram in which a reflective layer is disposed on the rear face of a medium may be used. Furthermore, the invention is not restricted to coaxial recording. A two-beam type in which a medium is irradiated with signal light and reference light in different directions may be employed. The invention can be similarly applied also to an optical signal recording medium using a system other than the hologram recording.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An optical signal recording medium comprising:
    at least one signal recording portion in which an optical signal is to be recorded; and
    a control information region which is a portion other than the signal recording plane, and in which at least one of a diffraction grating or a light reflecting member is disposed,
    wherein the control information region is provided on a side face of the optical signal recording medium,
    wherein the optical signal recording medium further comprises a principal face on which the optical signal to be recorded is incident; and
    wherein the side face extends at an angle other than 180° relative to the principal face.

2. The optical signal recording medium according to claim 1, wherein the side face comprises a portion which is parallel to an optical axis of a light beam for recording a signal into the signal recording portion, or reproducing a signal from the signal recording portion.

3. The optical signal recording medium according to claim 1, wherein the side face has a curved surface.

4. The optical signal recording medium according to claim 2, wherein the side face has a curved surface.

5. The optical signal recording medium according to claim 1, wherein the at least one of the diffraction grating or the light reflecting member is a hologram indicating different information depending on a location.

6. The optical signal recording medium according to claim 2, wherein the at least one of the diffraction grating or the light reflecting member is a hologram indicating different information depending on a location.

7. The optical signal recording medium according to claim 3, wherein the at least one of the diffraction grating or the light reflecting member is a hologram indicating different information depending on a location.

8. The optical signal recording medium according to claim 4, wherein the at least one of the diffraction grating or the light reflecting member is a hologram indicating different information depending on a location.

9. The optical signal recording medium according to claim 1, wherein an identification information recording portion indicating a reference position of the optical signal recording medium is disposed in the control information region.

10. The optical signal recording medium according to claim 2, wherein an identification information recording portion indicating a reference position of the optical signal recording medium is disposed in the control information region.

11. The optical signal recording medium according to claim 3, wherein an identification information recording portion indicating a reference position of the optical signal recording medium is disposed in the control information region.

12. The optical signal recording medium according to claim 4, wherein an identification information recording portion indicating a reference position of the optical signal recording medium is disposed in the control information region.

13. The optical signal recording medium according to claim 5, wherein an identification information recording portion indicating a reference position of the optical signal recording medium is disposed in the control information region.

14. The optical signal recording medium according to claim 6, wherein an identification information recording portion indicating a reference position of the optical signal recording medium is disposed in the control information region.

15. The optical signal recording medium according to claim 7, wherein an identification information recording portion indicating a reference position of the optical signal recording medium is disposed in the control information region.

16. The optical signal recording medium according to claim 8, wherein an identification information recording portion indicating a reference position of the optical signal recording medium is disposed in the control information region.

17. An information recording/reproducing apparatus comprising:
    a supporting portion which supports an optical signal recording medium having:
        at least one signal recording portion in which an optical signal is to be recorded; and
        a control information region which is a portion other than the signal recording portion, and in which at least one of a diffraction grating or a light reflecting member is disposed;
        wherein the control information region is provided on a side face of the optical signal recording medium;
    an optical information processing portion which irradiates the signal recording portion of the optical signal recording medium with a light beam including information to be recorded, or which irradiates the signal recording portion of the optical signal recording medium with a light beam for reproducing an optical signal recorded in the signal recording portion of the optical signal recording medium; and a positioning controlling portion which irradiates the at least one of the diffraction grating or the light reflecting member disposed in the control information region, with a light beam that is different from the light beam emitted by the optical information processing portion, which detects transmitted or reflected light from the at least one of the diffraction grating or the light reflecting member, and which performs positioning between the optical signal recording medium and the light beam emitted by the optical information processing portion, wherein the optical medium further comprises a principal face on which the optical signal to be recorded is incident; and wherein the side face extends at an angle other than 180° relative to the principal face.

18. The optical signal recording medium according to claim 3, wherein the control information region is configured to provide control information regarding a rotation angle of the optical signal recording medium.

* * * * *